A. JAMINET.
FILTER AND SEPARATOR.
No. 23,302. Patented Mar. 22, 1859.
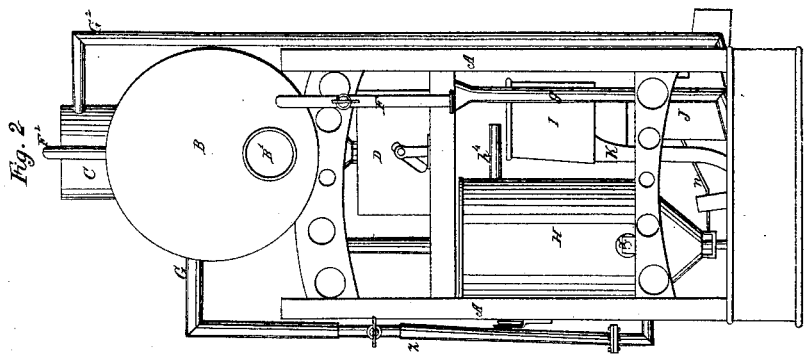
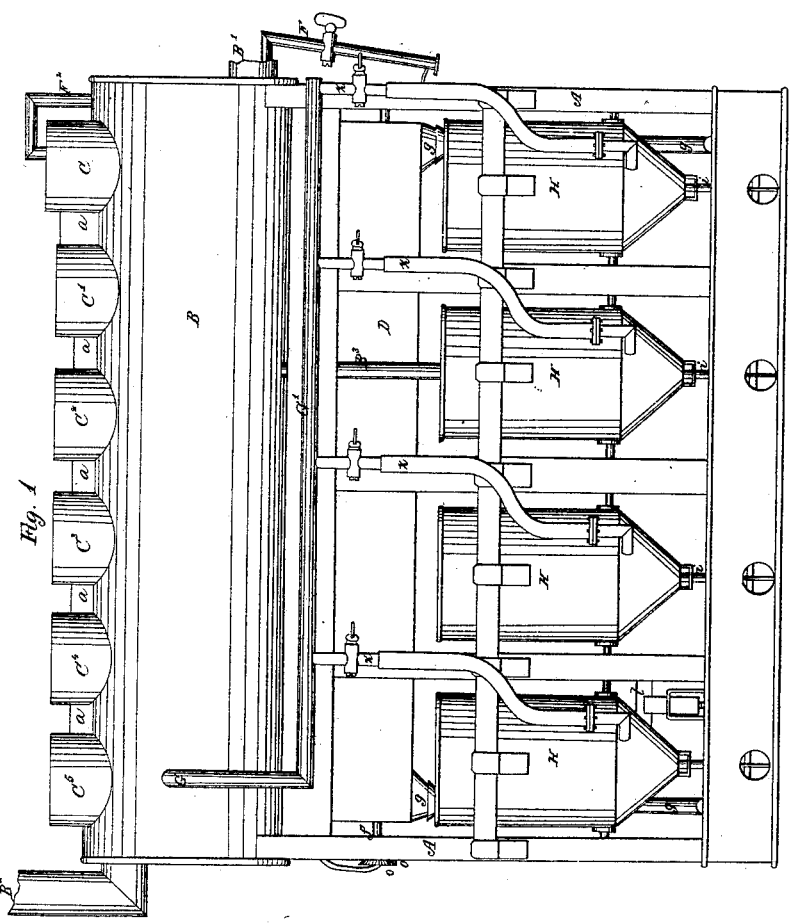

2 Sheets—Sheet 2.
A. JAMINET.
FILTER AND SEPARATOR.
No. 23,302.  Patented Mar. 22, 1859.
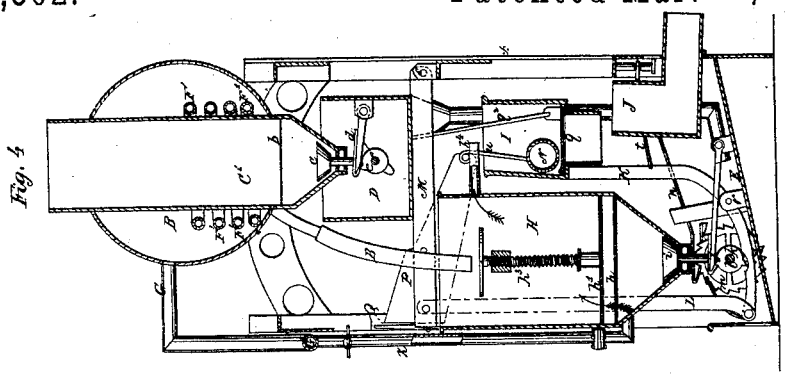
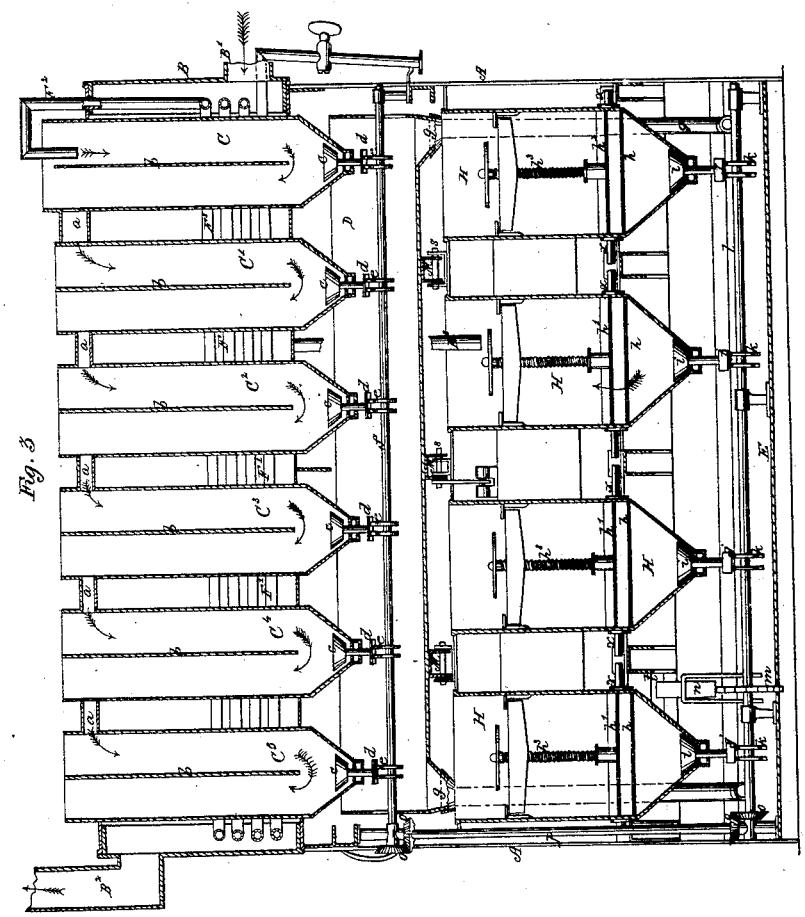
Witnesses.
Inventor:

UNITED STATES PATENT OFFICE.

A. JAMINET, OF ST. LOUIS, MISSOURI.

FILTER.

Specification of Letters Patent No. 23,302, dated March 22, 1859.

*To all whom it may concern:*

Be it known that I, A. JAMINET, of St. Louis, State of Missouri, have invented certain new and useful Improvements in Polyfilters and Separators Combined; and I do hereby declare that the following is a full, clear, and exact description of the same, reference being had to the accompanying drawings, forming a part of this specification, in which—

Figure 1, represents a side elevation of my improved polyfilter and separator combined. Fig. 2, an end elevation of the same. Fig. 3, represents a longitudinal vertical section of said apparatus, and Fig. 4, a transverse vertical section thereof.

Similar letters of reference, in each of the several figures indicate corresponding parts.

The invention has for its main object the purifying of the feed water to steam boilers of every description for mechanical and industrial purposes, inclusive of steamboat boilers, to which it is particularly applicable. My invention effects this object in an automatic, advantageous and economical manner, by being self cleansing at regular intervals and self discharging of the filtered water in a heated state by the employment of a current of waste steam operating in connection with a peculiar arrangement of water pipes.

By the use of my improved apparatus, which requires little or no management, water having sediment or other matter held in mechanical suspension, or salts of lime, is purified preparatory to its being fed to the boiler which is thus saved from becoming thickly coated on the inside with injurious and heat obstructing foreign matter, thereby producing economy in many respects and reducing the risk of explosion.

Other profitable results are also attained from the use of my improved apparatus, as will appear from inspection of the accompanying drawings taken in connection with the following explanations.

To enable others, skilled in the art, to make and use my invention, I will proceed to describe its construction and operation.

A is a frame of any suitable build and material for the support of the operative portions of the apparatus. This frame A, carries a drum B, in and through which are arranged a series of separators $C$, $C^1$, $C^2$, $C^3$, $C^4$, $C^5$, connected near their tops by branch pipes $a$. Each of these separators is furnished with a vertical partition $b$, descending to within a short distance of their bottom which is made funnel shaped and provided with a valve $c$, opening upward, the stems of which valves project below the separators and rest on or touch or nearly touch levers $d$, that on being raised at intervals by intermittently revolving toothed disks $e$, on a shaft $f$, lift the valves $c$, to allow the mud and deposit which settle in the bottom of the separators to pass off into a mud trough D, provided with outlet pipes $g$, that conduct the deposit on to a discharging bottom E. The water to be cleansed is entered by a pipe F, at one end and circulated backward and forward repeatedly throughout the length of the drum B, and around the separators by pipes $F'$, and delivered up through a pipe $F^2$, into the front division or chamber of the foremost separator C, from whence it passes and circulates up into the next division or chamber formed by the partition $b$ in said separator, and from thence by the first connecting branch $a$, to the next separator $C'$, down and up which it circulates in like manner and so on to the other separators till filling the last separator $C^5$, when it passes off by a pipe G, to a horizontal discharge pipe $G'$, which serves to supply the filterers as hereinafter described.

An overflow or surplus discharge pipe $G^2$, is furnished the rear separator $C^5$, to carry off surplus water down to the discharging bottom E, and which will serve to aid in washing off the deposit falling thereon.

The drum B, is provided with a steam inlet nozzle $B'$, at the one end and a steam outlet $B^2$, at the other end, for the purpose of passing a current of steam through the drum and which will serve to heat the water circulating through the pipes $F'$, also the water in the several separators, whereby much economy will result in keeping up the supply of steam in the boiler by the water being fed thereto in a hot or heated state and whereby the settlement of foreign matter held in mechanical suspension in the water is accelerated by the circulation which is produced by the water alternately rising and falling in its passage through and to the several separators and causing deposit to accumulate in the bottoms of the separators and the water to pass off from the rear separator by the pipe G, free from much gross foreign matter and in a partially purified state. Thus heating the water for this purpose, I propose to effect at no additional expense, by using as the current which is blown through the drum B, the waste steam of the engine. A pipe B², serves to carry off the condensed steam or water from the drum and which may be used for washing or many other useful purposes. The partially purified and heated water passing off from the rear separator by the pipe G, to the horizontal discharge pipe G', is then led by branch pipes z, which have shut off cocks or regulating faucets, to the lower portions of filtering vessels H, arranged below and which have their bottoms of funnel shaped form and are provided, above the points of entry of the water; with perforated plates h, h', between which is packed saw dust for the water to percolate up through. One of these perforated plates h', in each filterer, is made adjustable toward or from the other plate h, by screws h³, to regulate the compression of the intermediate saw dust as required and to vary the bulk of saw dust. These filterers H, are hung upon pivots x, x, by which they may be swung or turned to a horizontal or inclined position to facilitate cleaning and renewal of the saw dust. The filtered water passes off from the filterers H, by upper branch pipes or nozzles h⁴, into a clear water receiving trough I. Puppet valves i, opening upward and having stems projecting below are fitted to the bottoms of the filters for the discharge, from time to time, of filtered matter and deposit collecting in the bottoms of the filterers. The stems of these valves touch, or nearly touch, levers j, that are raised at intervals to open the valves by intermittently revolving toothed disks k, of a shaft l, which carries a ratchet wheel m, that is operated by a pawl or hook n. The lower valve operating shaft l, is connected by gearing o, o, o, o, and intermediate shaft p, with the upper or separator valve operating shaft f.

The clear water receiving trough I, is provided with a valve q, that is held by a link rod q², and opens at intervals to discharge the clear filtered and heated water into a feed water branch J, that connects with the boiler or supply pump or tank thereof. This supply of heated, filtered water in regular quantities, as also the cleansing of the apparatus, is effected automatically as follows: The clear water trough I rests upon bent levers K, having their fulcra r, below and out of the perpendicular line of the trough. These levers K, are jointed on the other side of their fulcra to rods L, which in turn connect with levers or arms M, carrying the mud trough D, and having their fulcra s, in rear of the latter. Connected with one of the bent levers on which the clear water trough rests, by a secondary lever t, is the pawl n, that serves to drive the ratchet wheel m, which rotates the puppet valves operating shafts as before specified.

Now it will be obvious that on the trough I, becoming filled with clear filtered water from the filterers H, by the nozzles h⁴, said trough resting as described on the bent levers K, will tip by the weight of the water contained therein and causing the trough valve q, to open, will discharge the filtered water into the feed water branch J, also the mud trough D, will be similarly operated from the same cause; and the pawl n, will propel the ratchet wheel m, a tooth, and by the specified connection of the parts, move the puppet valve operating shafts f, l, but will not cause the puppet valves at the bottoms of the separators and filterers to open, for discharge of deposit, till a series of ratchet feeds of the valve operating shafts f, l, have been made, and till the tooth on each of the disks e, k, of said shafts come in contact with the levers d, j, on which the valve stems rest, as it is not necessary to open these valves every time the clear water trough I, tips to discharge filtered water. Upon the clear water trough I, having thus automatically effected its discharge and operated the several parts to effect self cleansing at regular intervals as required, the weight of water being diminished in said trough, the counter-acting weight of the connecting mechanism readily "rights" said trough again as also the mud trough and various levers and devices including the closing of the trough discharging valve to secure a repetition of the same action generally on the clear water trough again filling or becoming heavy enough with water to effect its tip. To make yet more sure, however, the tipping of the clear water trough at the proper time, I provide said trough with a flutterer or float N, connected by a rod u, with a lever P, that provides a fulcrum for the arm M, of the trough, unlocks a hook or catch Q, which holds the said trough, through the arm M, from tipping before it is full or ready for discharging; at which time, the water, acting on the float, releases the lock and allows the trough to empty itself.

What I claim as my invention and desire to secure by Letters Patent, is—

1. Circulating the water to be filtered through tiers or courses of pipes arranged within a drum having a current of waste steam passing through it, and then passing said water into separators for further circulation and for depriving it of mud, and other foreign matters.

2. Arranging the separators C, C¹, C², C³, C⁴, C⁵, within the steam drum B.

3. Making the apparatus self cleansing at intervals by operating the valves at the bottoms of the separators and filterers by levers acted on by toothed disks, ratchet wheel and pawl, or their equivalents actuated by the automatic movement of the clear water trough in tipping or tilting to discharge, essentially as set forth.

4. Controlling the automatic discharging action of the clear water trough by means of a flutterer or float arranged therein and serving by connection with an unlocking lever, a stop piece and catch or hook to hold the trough from prematurely tilting.

A. JAMINET.

Witnesses:
A. TETARD,
W. KAMP.